United States Patent
Zhang et al.

(10) Patent No.: US 10,710,029 B2
(45) Date of Patent: Jul. 14, 2020

(54) METHOD OF PREPARING HYBRID MEMBRANE

(71) Applicant: Nanjing University, Nanjing (CN)

(72) Inventors: Weiming Zhang, Nanjing (CN); Yi Ren, Nanjing (CN); Bingcai Pan, Nanjing (CN); Ming Hua, Nanjing (CN); Lu Lv, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 16/248,742

(22) Filed: Jan. 15, 2019

(65) Prior Publication Data

US 2020/0055005 A1 Feb. 20, 2020

(30) Foreign Application Priority Data

Aug. 20, 2018 (CN) .......................... 2018 1 0949757

(51) Int. Cl.
*B01D 69/14* (2006.01)
*B01D 61/14* (2006.01)
*B01D 67/00* (2006.01)
*B01D 71/02* (2006.01)
*B01D 71/34* (2006.01)
*B01D 71/64* (2006.01)
*C02F 1/44* (2006.01)

(52) U.S. Cl.
CPC ......... *B01D 69/148* (2013.01); *B01D 61/145* (2013.01); *B01D 67/0011* (2013.01); *B01D 67/0013* (2013.01); *B01D 67/0018* (2013.01); *B01D 67/0079* (2013.01); *B01D 69/145* (2013.01); *B01D 69/147* (2013.01); *B01D 71/022* (2013.01); *B01D 71/34* (2013.01); *B01D 71/64* (2013.01); *C02F 1/444* (2013.01); *B01D 2323/02* (2013.01)

(58) Field of Classification Search
CPC .. B01D 69/148; B01D 69/147; B01D 69/145; B01D 71/34; B01D 67/0013; B01D 71/64; B01D 67/0011; B01D 67/0018; B01D 67/0079; B01D 61/145; B01D 71/022; B01D 2323/02; C02F 1/444
See application file for complete search history.

(56) References Cited

U.S. PATENT DOCUMENTS

| | | | |
|---|---|---|---|
| 9,211,506 B2 * | 12/2015 | Shih .................. | B01D 67/0016 |
| 2009/0149313 A1 * | 6/2009 | Liu ...................... | B01D 53/228 502/4 |
| 2016/0038885 A1 * | 2/2016 | Hogen-Esch ...... | B01D 67/0009 210/321.6 |

OTHER PUBLICATIONS

Dlamini, D. S.; Mamba, B. B.; Li, J. The Role of Nanoparticles in the Performance of Nano-Enabled Composite Membranes—A Critical Scientific Perspective. Science of the Total Environment 2019, 656, 723-731. (Year: 2019).*

* cited by examiner

*Primary Examiner* — William P Fletcher, III
(74) *Attorney, Agent, or Firm* — Matthias Scholl P.C.; Matthias Scholl

(57) ABSTRACT

A method of preparing a hybrid membrane, the method including: evenly mixing a granular material and a dispersant, to yield a dispersion solution; evenly mixing a polymer and an organic solvent, to yield a matrix solution; adding the matrix solution to the dispersion solution to yield a mixed solution; heating the mixed solution to remove the dispersant, to yield a casting solution; and coating the casting solution on a substrate, followed by removal of the organic solvent, to yield a hybrid membrane.

11 Claims, 6 Drawing Sheets

METHOD OF PREPARING HYBRID MEMBRANE

CROSS-REFERENCE TO RELATED APPLICATIONS

Pursuant to 35 U.S.C. § 119 and the Paris Convention Treaty, this application claims foreign priority to Chinese Patent Application No. 201810949757.3 filed Aug. 20, 2018, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, Mass. 02142.

BACKGROUND

This disclosure relates to a method of preparing a hybrid membrane.

In recent years, membrane technology has been widely used in wastewater treatment.

Conventional ultrafiltration membranes are inefficient to remove small-scale pollutants, such as heavy metal ions and small molecular organic matters.

Mixed matrix membranes (MMMs) include hybrid granular materials which function as adsorbents or catalysts to adsorb or catalytically oxidize heavy metal ions and small molecular organic matters. However, the content of the hybrid granular materials in the mixed matrix membranes is no more than 10 wt. %. In addition, the hybrid granular materials are loosely coupled to the mixed matrix membranes.

SUMMARY

Disclosed is a method of preparing a hybrid membrane. The prepared hybrid membrane has relatively high load capacity of particles.

The disclosure provides a method of preparing a hybrid membrane, the method comprising:
1) evenly mixing a granular material and a dispersant, to yield a dispersion solution;
2) evenly mixing a polymer and an organic solvent, to yield a matrix solution; adding the matrix solution to the dispersion solution to yield a mixed solution;
3) heating the mixed solution obtained in (2) to remove the dispersant, to yield a casting solution; and
4) coating the casting solution on a substrate, followed by removal of the organic solvent, to yield a hybrid membrane.

The granular material can be a micron or nanoscale adsorbent or catalyst, selected from metal-organic frameworks, metal hydroxides, metal oxides, metals, graphene oxides, and graphene; and the produced hybrid membrane can comprise 1-80 wt. % of the granular material.

The dispersant can be selected from the group consisting of acetone, methanol, ethanol, and surfactants.

The polymer can be selected from the group consisting of polyvinylidene fluoride, polytetrafluoroethylene, cellulose diacetate, cellulose triacetate, mixed cellulose, polysulfone, sulfonated polysulfone, polyethersulfone, polypropylene, polyacrylonitrile, polyvinyl chloride, polysulfonyl, amine polyether ketone, polyaliphatic amide, polyimide, and polyether imide; and the produced hybrid membrane comprises 20-99 wt. % of the polymer.

The organic solvent in (2) can be N,N-dimethylformamide or N,N-dimethylacetamide.

In (1), the granular material and the dispersant can be evenly mixed by mechanical stirring, magnetic stirring, oscillation, or ultrasonic.

In (4), the substrate can be a glass plate, an aluminum foil, an alumina substrate, or a polytetrafluoroethylene plate; and the casting solution can be manually or automatically coated on the substrate.

In (4), the removal of the organic solvent can be achieved by non-solvent induced phase separation or thermally induced phase separation.

The dispersion solution can comprise 0.1-70 wt. % of the granular material; the matrix solution comprises 1-50 wt. % of the polymer; and in 2), the mixed weight ratio of the dispersion solution to the matrix solution can be between 1:10 and 100:10.

In 3), the dispersant can be removed by concentrated evaporation, rotary evaporation, water bath heating, oil bath heating, oven heating, electric heating plate or electric furnace heating. The heating temperature can be between 40 and 150° C., and the heating time can be between 60 and 5000 min.

Advantages of the method of preparing a hybrid membrane as described in the disclosure are summarized as follows.

1. The addition of the dispersant can improve the dispersity of the granular materials, so that the prepared hybrid membrane has relatively high load capacity of particles.
2. The granular materials are evenly distributed on the hybrid membrane, thus increasing the adsorption rate per unit mass of the hybrid membrane with small molecular pollutants.
3. The nanoparticles are tightly coupled to the polymer membrane, thus enhancing the stability and prolonging the service life of the hybrid membrane.
4. The hybrid membrane is efficient in eliminating small-sized pollutants, has relatively large water flux, and exhibits relatively high ultrafiltration performance.

DETAILED DESCRIPTION

To further illustrate, embodiments detailing a method of preparing a hybrid membrane are described below. It should be noted that the following embodiments are intended to describe and not to limit the disclosure.

Example 1

A method of preparing a hybrid membrane is described as follows.

(1) Dispersion of Granular Material 300 mg of a granular material of a metal-organic framework MIL-53(Fe) and 10 mL of acetone were evenly mixed by ultrasonic for 30 min, to yield a dispersion solution.

(2) Mixing 150 mg of polyvinylidene fluoride (PVDF) and 2 mL of N,N-dimethylformamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 60° C. for 24 hours to remove the acetone therein, to yield a casting solution.

(4) Membrane Formation

Figure 1:
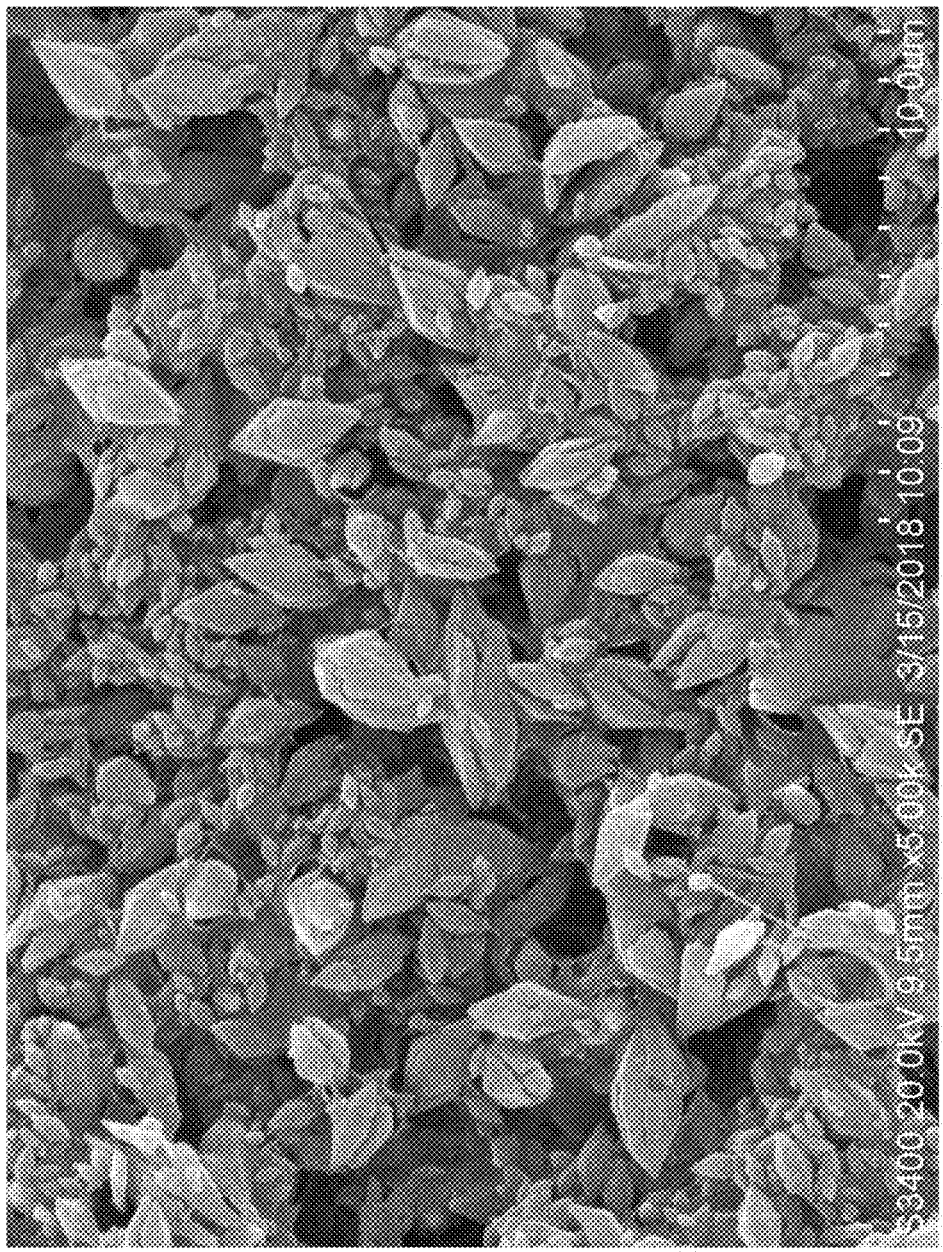
FIG. 1 is a scanning electron microscope (SEM) image of a surface of a hybrid membrane prepared in Example 1 of the disclosure.
Figure 2:
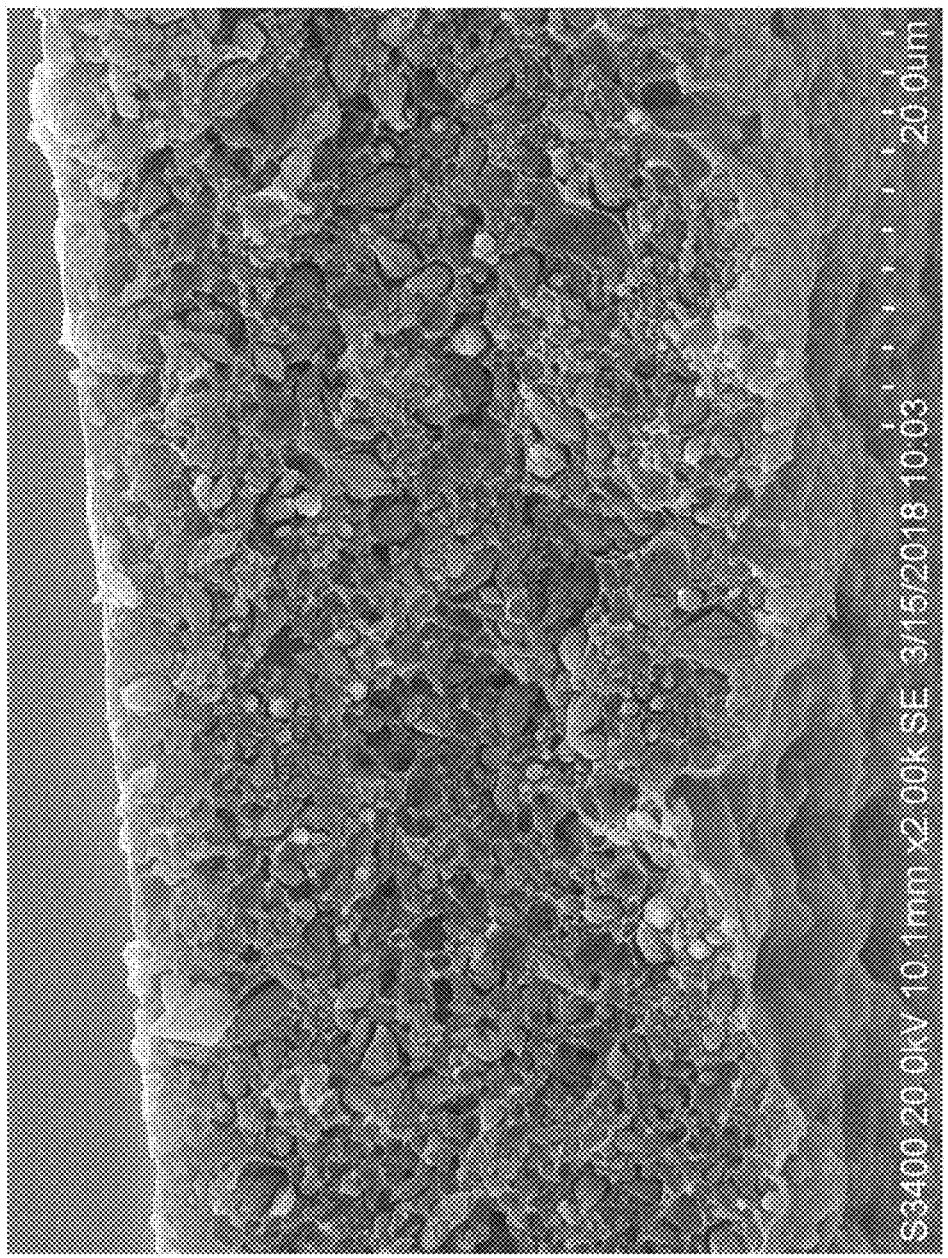
FIG. 2 is a scanning electron microscope (SEM) image of a cross section of a hybrid membrane prepared in Example 1 of the disclosure.

The casting solution was coated on a glass plate using a micron adjustable membrane maker. The glass plate was heated to 75° C. to remove the organic solvent through the thermally induced phase separation, to yield a hybrid membrane. The surface and the cross section of the hybrid membrane were detected using a scanning electron microscope, and the results are shown in FIGS. 1 and 2, respectively. The distribution of the iron on the surface of the hybrid membrane was measured through energy-dispersive X-ray spectroscopy, and the results are as shown in FIG. 3.

Figure 3:
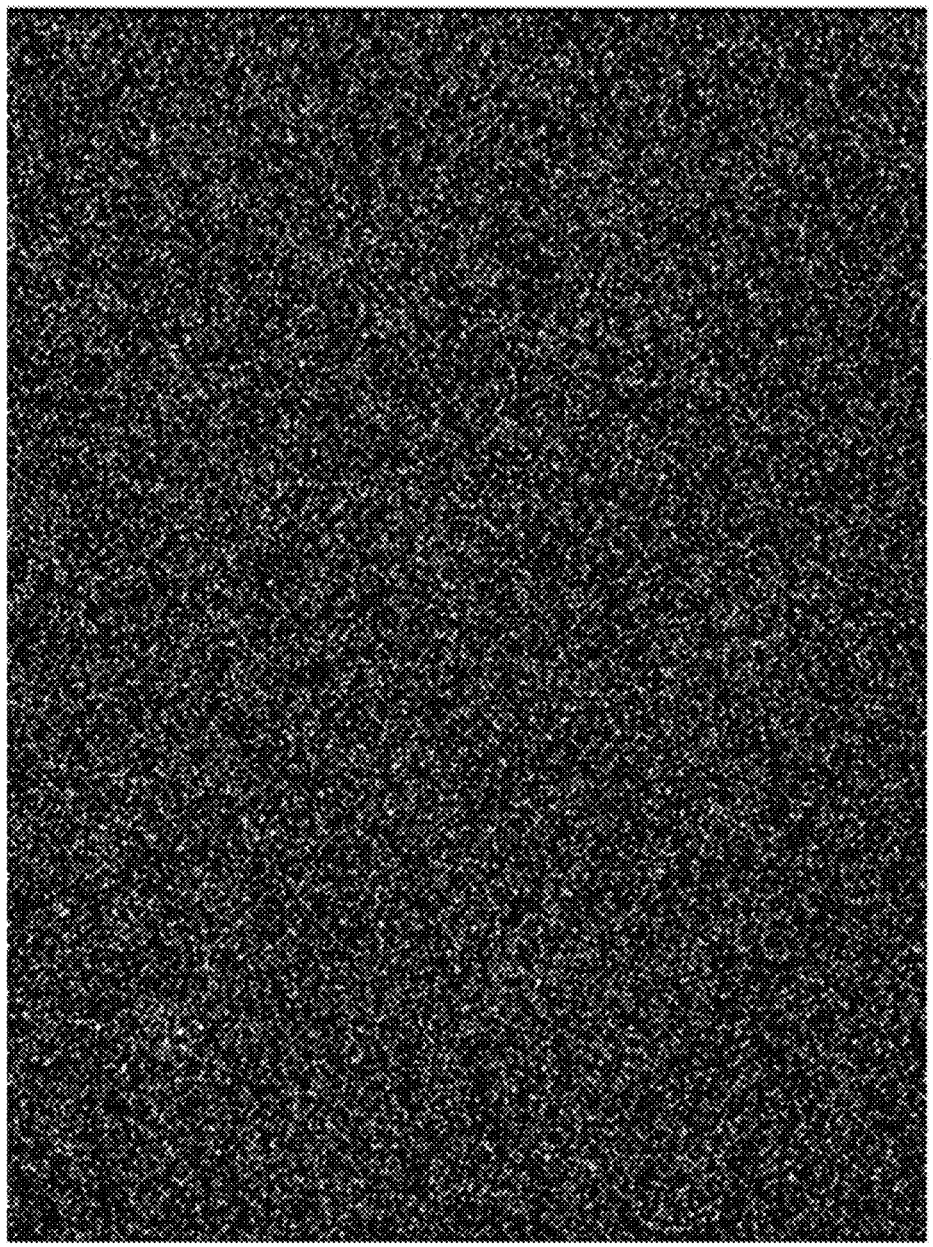
FIG. 3 is an energy-dispersive X-ray spectrogram (EDS) of a hybrid membrane prepared in Example 1 of the disclosure; the spectrogram shows the distribution of iron on the surface of the hybrid membrane.
Figure 4:
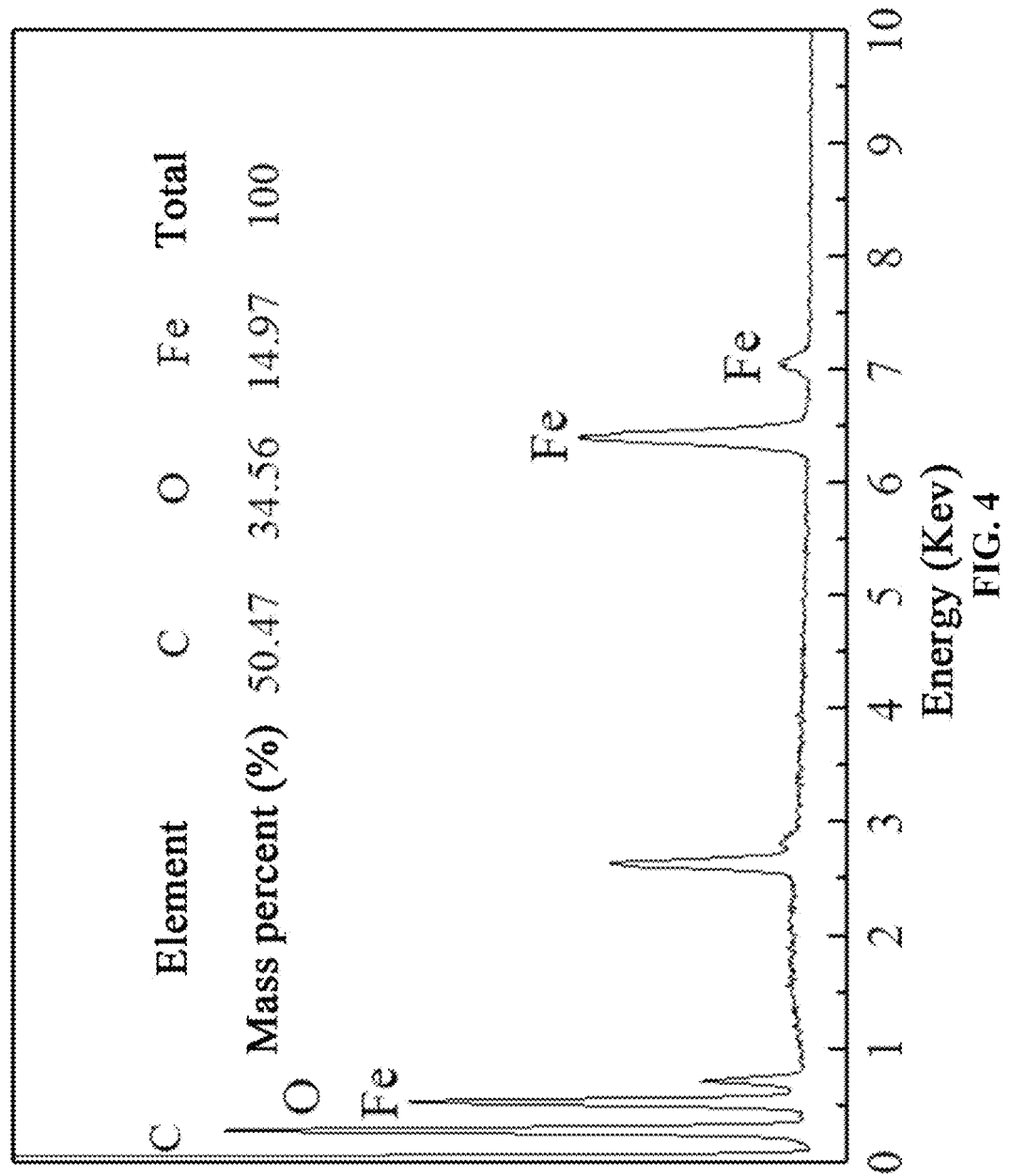
FIG. 4 is an energy-dispersive X-ray spectrogram (EDS) of a metal-organic framework MIL-53(Fe) used in Example 1 of the disclosure; the spectrogram shows the proportion of different elements.
Figure 5:
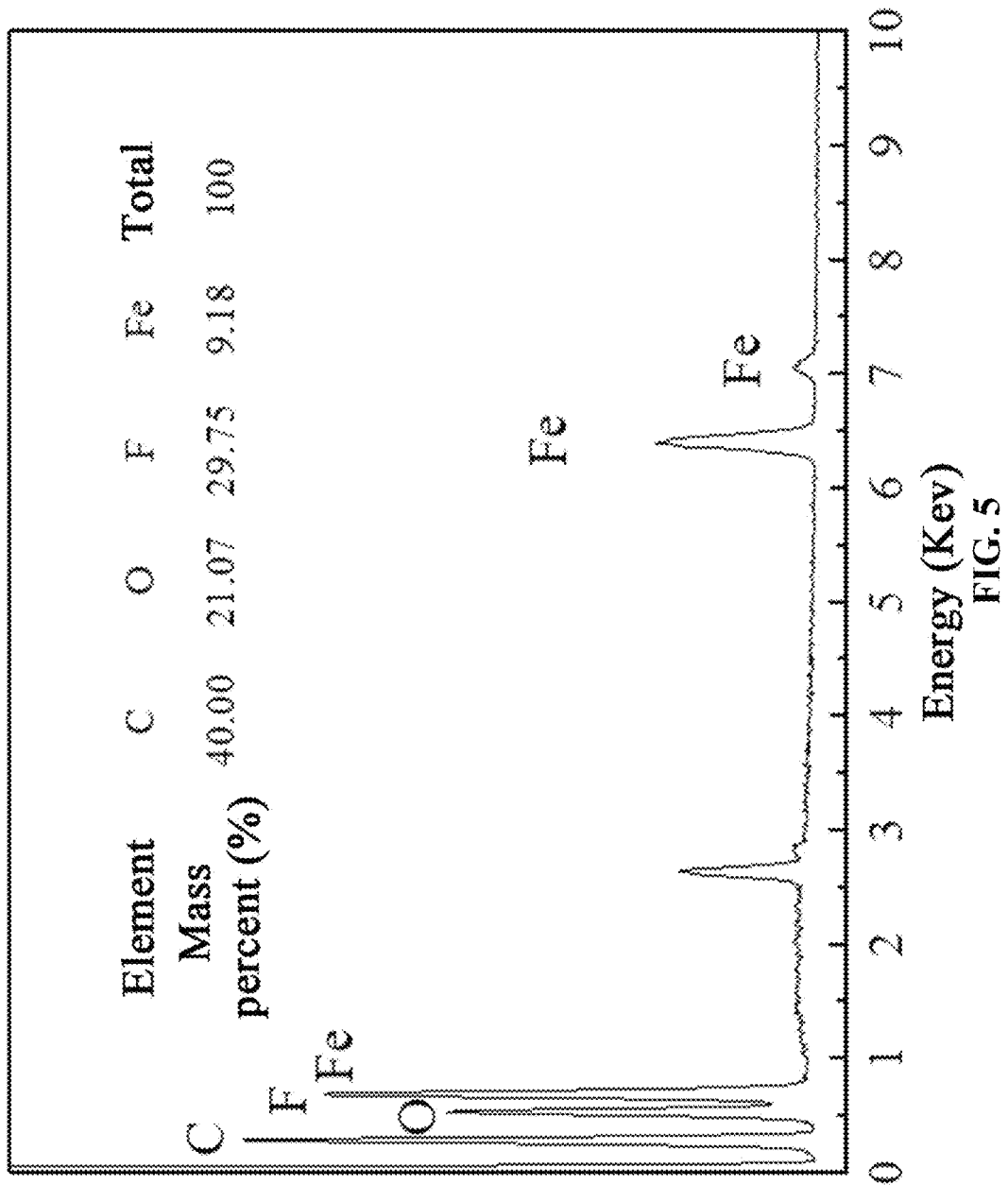
FIG. 5 is an energy-dispersive X-ray spectrogram (EDS) of a hybrid membrane prepared in Example 1 of the disclosure; the spectrogram shows the proportion of different elements.
Figure 6:
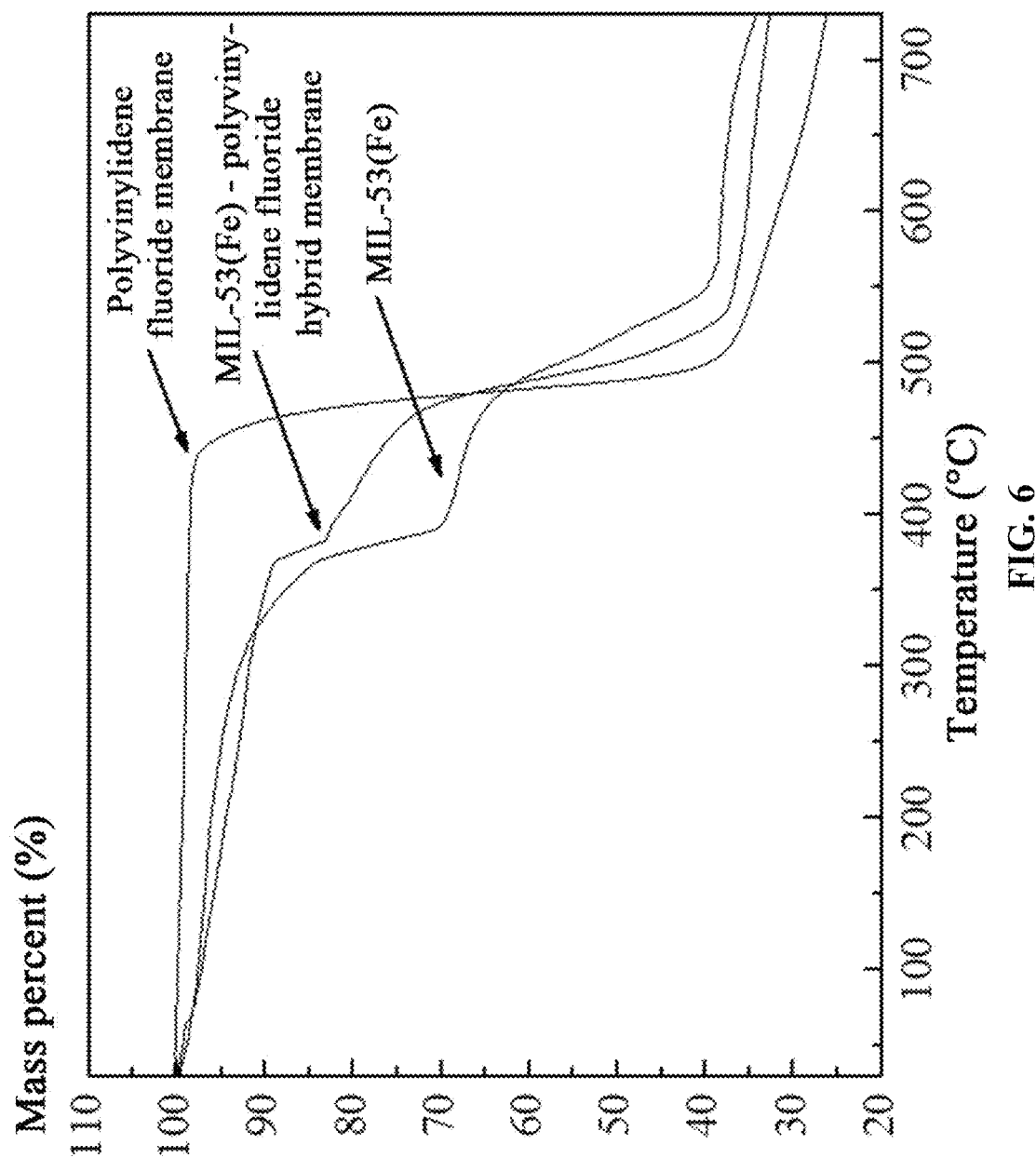
FIG. 6 is a thermogravimetric analysis chart of a hybrid membrane prepared in Example 1, and polyvinylidene fluoride membrane and a metal-organic framework MIL-53(Fe) used in comparison example 1 of the disclosure.

As shown in FIGS. 1-3, following the treatment of the dispersion of the granular material and the removal of the dispersant, the granular material MIL-53(Fe) can be evenly distributed on the hybrid membrane. The formed membrane comprises a plurality of air holes, and the membrane surface is rough, thus improving the hydrophilicity of the membrane material, and increasing the water flux. In addition, the treatment of the dispersion of the granular material and the removal of the dispersant can effectively limit the diameter of the air holes. No obvious macropore was observed under SEM. This can further enhance the ultrafiltration performance of the hybrid membrane. As shown in FIGS. 4-6, the load capacity of granular materials of the hybrid membrane prepared according to the method of the example exceeds 60 wt. %.

Comparison Example 1

A conventional method of preparing a hybrid membrane is described as follows.

1. Preparation of Casting Solution 15 mg of MIL-53(Fe) particles, 15 mg of polyvinylidene fluoride, and 2 mL of N,N-dimethylformamide were evenly mixed by ultrasonic for 30 min until the polyvinylidene fluoride was completely dissolved, to yield a casting solution.

2. Membrane Formation

The casting solution obtained in (1) was coated on a glass plate using a micron adjustable membrane maker. Thereafter, the glass plate was immersed in pure water to remove the organic solvent through the non-solvent induced phase separation, to yield a hybrid membrane.

Comparison Example 2

A conventional method of preparing a hybrid membrane is described as follows.

1. Preparation of Casting Solution 300 mg of a granular material MIL-53(Fe), 150 mg of polyvinylidene fluoride, and 2 mL of N,N-dimethylformamide were evenly mixed by ultrasonic for 30 min until the polyvinylidene fluoride was completely dissolved, to yield a casting solution.

2. Membrane Formation

The casting solution obtained in (1) was coated on a glass plate using a micron adjustable membrane maker. Thereafter, the glass plate was immersed in pure water to remove the organic solvent through the non-solvent induced phase separation, to yield a hybrid membrane.

Comparison Example 3

A conventional method of preparing a hybrid membrane is described as follows.

(1) Dispersion of Granular Material 300 mg of a granular material of a metal-organic framework MIL-53(Fe) was added to 10 mL of acetone. The solution was evenly mixed by ultrasonic for 30 min, to yield a dispersion solution.

(2) Mixing 150 mg of polyvinylidene fluoride was added to 2 mL of N,N-dimethylformamide. The solution was evenly mixed by ultrasonic for 30 min, to yield a matrix solution. The matrix solution was mixed with the dispersion solution and treated by ultrasonic for 30 min, to yield a mixed solution.

(3) Membrane Formation

The casting solution obtained in (2) was coated on a glass plate using a micron adjustable membrane maker. The glass plate was heated to 75° C. to remove the organic solvent through the thermally induced phase separation, to yield a hybrid membrane.

The PVDF hybrid membrane prepared in Example 1 comprises 67 wt. % of the MIL-53(Fe), can effectively adsorb and catalytically oxidize methylene blue. For example, the removal rate against 20 mg/L methylene blue solution in 42.5 L/m$^2$ wastewater can be as high as 75%. In addition, the pure water flux of the hybrid membrane is 222 L/m$^2$h, and the interception rate against the bovine serum protein is as high as 86%. The hybrid membrane prepared in comparison example 1 is inefficient in degrading methylene blue. Under the removal rate of 75% of the methylene blue, the wastewater volume effectively treated by the hybrid membrane in Example 1 is about 9 times that of the hybrid membrane in comparison Example 1.

The hybrid membrane prepared without addition of a dispersant in comparison example 2 exhibits no ultrafiltration performance, and no hybrid membrane can be formed in comparison example 3 due to without removal of the dispersant.

Example 2

A method of preparing a hybrid membrane is described as follows.

(1) Dispersion of Granular Material 1 g of nanoparticles of $Fe_2O_3$ and 10 mL of methanol were evenly mixed and stirred, to yield a dispersion solution.

(2) Mixing 1 g of polyvinylidene fluoride (PVDF) and 100 mL of N,N-dimethylformamide were evenly mixed and stirred, to yield a matrix solution. The matrix solution was mixed and stirred with the dispersion solution, to yield a mixed solution.

(3) Removal of Dispersant

The mixed solution was rotary evaporated at 40° C. for 5000 min to remove the methanol therein, to yield a casting solution.

(4) Membrane Formation

The casting solution obtained in (3) was coated on a plastic plate using an automatic membrane maker. Thereafter, the plastic plate was immersed in pure water to remove the organic solvent through the non-solvent induced phase separation, to yield a hybrid membrane.

The PVDF hybrid membrane prepared in the example comprises 50 wt. % of $Fe_2O_3$ particles, can effectively adsorb and catalytically oxidize methylene blue. The removal rate against 5 mg/L methylene blue solution can be as high as 90%. In addition, the hybrid membrane exhibits ultrafiltration performance and has relatively high water flux.

Example 3

A method of preparing a hybrid membrane is described as follows.

(1) Dispersion of Granular Material 1 mg of graphene oxide particles and 1.26 mL of ethanol were evenly mixed and oscillated, to yield a dispersion solution.

(2) Mixing 99 mg of polyacrylonitrile and 1 mL of N,N-dimethylacetamide were evenly mixed and oscillated, to yield a matrix solution. The matrix solution was mixed and oscillated with the dispersion solution, to yield a mixed solution.

(3) Removal of Dispersant

The mixed solution was rotary evaporated at 60° C. for 24 hours to remove the ethanol therein, to yield a casting solution.

(4) Membrane Formation

The casting solution obtained in (3) was coated on a glass plate using an automatic membrane maker. Thereafter, the glass plate was immersed in pure water to remove the organic solvent through the non-solvent induced phase separation, to yield a hybrid membrane.

The polyacrylonitrile hybrid membrane prepared in the example comprises 1 wt. % of graphene oxide particles, can effectively adsorb and catalytically oxidize methylene blue. The removal rate against 5 mg/L methylene blue solution can be as high as 90%. In addition, the hybrid membrane exhibits ultrafiltration performance and has relatively high water flux.

Example 4

A method of preparing a hybrid membrane is described as follows.

(1) Dispersion of Granular Material 1 g of silver particles and 0.54 mL of methanol were evenly mixed and oscillated, to yield a dispersion solution.

(2) Mixing 0.25 g of polyacrylonitrile and 0.4 mL of N,N-dimethylacetamide were evenly mixed and oscillated, to yield a matrix solution. The matrix solution was mixed and oscillated with the dispersion solution, to yield a mixed solution.

N,N-dimethylacetamide and N,N-dimethylformamide are both organic solvents with strong polarity. They can dissolve and disperse organic substances. In the process of membrane formation, they can be removed by non-solvent induced phase separation or thermally induced phase separation. Therefore, N,N-dimethylacetamide, N,N-dimethylformamide and other polar organic solvents can be selected as appropriate in the preparation of polymer solutions.

(3) Removal of Dispersant

The mixed solution was heated to 150° C. for 10 hours in an oven to remove the methanol therein, to yield a casting solution.

(4) Membrane Formation

The casting solution obtained in (3) was coated on an aluminum foil using an automatic membrane maker. Thereafter, the aluminum foil was heated to 75° C. to remove the organic solvent through the thermally induced phase separation, to yield a hybrid membrane.

The polyacrylonitrile hybrid membrane prepared in the example comprises 80 wt. % of silver particles, can effectively adsorb and catalytically oxidize p-nitrophenol. The removal rate against 5 mg/L p-nitrophenol solution can be as high as 90%. In addition, the hybrid membrane exhibits ultrafiltration performance and has relatively high water flux.

Example 5

A method of preparing a hybrid membrane is described as follows.

(1) Dispersion of Granular Material 300 mg of graphene particles and 10 mL of acetone were evenly mixed by ultrasonic for 30 min, to yield a dispersion solution.

(2) Mixing 150 mg of mixed cellulose and 2 mL of N,N-dimethylformamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 60° C. for 24 hours to remove the acetone therein, to yield a casting solution.

(4) Membrane Formation

The casting solution obtained in (3) was coated on a glass plate using an automatic membrane maker. Thereafter, the glass plate was heated to 75° C. to remove the organic solvent through the thermally induced phase separation, to yield a hybrid membrane.

The mixed cellulose hybrid membrane prepared in the example comprises 67 wt. % of graphene particles, can effectively adsorb and catalytically oxidize methylene blue. The removal rate against 5 mg/L methylene blue solution can be as high as 90%. In addition, the hybrid membrane exhibits ultrafiltration performance and has relatively high water flux.

Example 6

A method of preparing a hybrid membrane is described as follows.

(1) Dispersion of Granular Material 300 mg of metal hydroxide particles and 10 mL of acetone were evenly mixed by ultrasonic for 30 min, to yield a dispersion solution.

(2) Mixing 150 mg of cellulose diacetate and 2 mL of N,N-dimethylacetamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 60° C. for 24 hours to remove the acetone therein, to yield a casting solution.

(4) Membrane Formation

The casting solution obtained in (3) was coated on a glass plate using a micro adjustable membrane maker. Thereafter, the glass plate was heated to 75° C. to remove the organic solvent through the thermally induced phase separation, to yield a hybrid membrane.

The cellulose diacetate hybrid membrane prepared in the example comprises 67 wt. % of metal hydroxide particles, can effectively adsorb and catalytically oxidize methylene blue. The removal rate against 5 mg/L methylene blue solution can be as high as 90%. In addition, the hybrid membrane exhibits ultrafiltration performance and has relatively high water flux.

Example 7

A method of preparing a hybrid membrane is described as follows.

(1) Dispersion of Granular Material 1 g of silver particles and 0.6 mL of methanol were evenly mixed and oscillated, to yield a dispersion solution.

(2) Mixing 0.25 g of polysulfone and 0.27 mL of N,N-dimethylacetamide were evenly mixed and oscillated, to yield a matrix solution. The matrix solution was mixed and oscillated with the dispersion solution, to yield a mixed solution.

(3) Removal of Dispersant

The mixed solution was heated to 150° C. in an oven for 10 hours to remove the methanol therein, to yield a casting solution.

(4) Membrane Formation

The casting solution obtained in (3) was coated on an aluminum foil using an automatic membrane maker. Thereafter, the glass plate was heated to 75° C. to remove the organic solvent through the thermally induced phase separation, to yield a hybrid membrane.

The polysulfone hybrid membrane prepared in the example comprises 80 wt. % of silver particles, can effectively adsorb and catalytically oxidize P-nitrophenol. The removal rate against 5 mg/L P-nitrophenol solution can be as high as 90%. In addition, the hybrid membrane exhibits ultrafiltration performance and has relatively high water flux.

Example 8

A method of preparing a hybrid membrane is described as follows.

(1) Dispersion of Granular Material 300 mg of MIL-53(Fe) particles and 10 mL of acetone were evenly mixed by ultrasonic for 30 min, to yield a dispersion solution.

(2) Mixing 150 mg of polypropylene and 2 mL of N,N-dimethylformamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 60° C. for 24 hours to remove the acetone therein, to yield a casting solution.

(4) Membrane Formation

The casting solution obtained in (3) was coated on a glass plate using a micro adjustable membrane maker. Thereafter, the glass plate was heated to 75° C. to remove the organic solvent through the thermally induced phase separation, to yield a hybrid membrane.

The polypropylene hybrid membrane prepared in the example comprises 67 wt. % of MIL-53(Fe) particles, can effectively adsorb and catalytically oxidize methylene blue. The removal rate against 20 mg/L methylene blue solution can be as high as 90%. In addition, the hybrid membrane exhibits ultrafiltration performance and has relatively high water flux.

Example 9

A method of preparing a hybrid membrane is described as follows.

(1) Dispersion of Granular Material 300 mg of MIL-53(Fe) particles and 10 mL of acetone were evenly mixed by ultrasonic for 30 min, to yield a dispersion solution.

(2) Mixing 150 mg of polysulfone and 2 mL of N,N-dimethylformamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 60° C. for 24 hours to remove the acetone therein, to yield a casting solution.

(4) Membrane Formation

The casting solution obtained in (3) was coated on a glass plate using a micro adjustable membrane maker. Thereafter, the glass plate was heated to 75° C. to remove the organic solvent through the thermally induced phase separation, to yield a hybrid membrane.

The polysulfone hybrid membrane prepared in the example comprises 67 wt. % of MIL-53(Fe) particles, can effectively adsorb and catalytically oxidize methylene blue. The removal rate against 20 mg/L methylene blue solution can be as high as 90%. In addition, the hybrid membrane exhibits ultrafiltration performance and has relatively high water flux.

Example 10

A method of preparing a hybrid membrane is described as follows.

(1) Dispersion of Granular Material 300 mg of MIL-53(Fe) particles and 10 mL of acetone were evenly mixed by ultrasonic for 30 min, to yield a dispersion solution.

(2) Mixing 150 mg of amine polyether ketone and 2 mL of N,N-dimethylformamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 60° C. for 24 hours to remove the acetone therein, to yield a casting solution.

(4) Membrane Formation

The casting solution obtained in (3) was coated on a glass plate using a micro adjustable membrane maker. Thereafter, the glass plate was heated to 75° C. to remove the organic solvent through the thermally induced phase separation, to yield a hybrid membrane.

The hybrid membrane prepared in the example comprises 67 wt. % of MIL-53(Fe) particles, can effectively adsorb and catalytically oxidize methylene blue. The removal rate against 20 mg/L methylene blue solution can be as high as 90%. In addition, the hybrid membrane exhibits ultrafiltration performance and has relatively high water flux.

Example 11

A method of preparing a hybrid membrane is described as follows.

(1) Dispersion of Granular Material 300 mg of MIL-53(Fe) particles and 10 mL of acetone were evenly mixed by ultrasonic for 30 min, to yield a dispersion solution.

(2) Mixing 150 mg of polyaliphatic amide and 2 mL of N,N-dimethylformamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 60° C. for 24 hours to remove the acetone therein, to yield a casting solution.

(4) Membrane Formation

The casting solution obtained in (3) was coated on a glass plate using a micro adjustable membrane maker. Thereafter, the glass plate was heated to 75° C. to remove the organic solvent through the thermally induced phase separation, to yield a hybrid membrane.

The hybrid membrane prepared in the example comprises 67 wt. % of MIL-53(Fe) particles, can effectively adsorb and catalytically oxidize methylene blue. The removal rate against 20 mg/L methylene blue solution can be as high as 90%. In addition, the hybrid membrane exhibits ultrafiltration performance and has relatively high water flux.

Example 12

A method of preparing a hybrid membrane is described as follows.

(1) Dispersion of Granular Material 300 mg of MIL-53(Fe) particles and 2 mL of acetone were evenly mixed by ultrasonic for 30 min, to yield a dispersion solution.

(2) Mixing 150 mg of polyvinylidene fluoride and 10 mL of N,N-dimethylformamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 150° C. for one hour to remove the acetone therein, to yield a casting solution.

(4) Membrane Formation

The casting solution obtained in (3) was coated on a glass plate using a micro adjustable membrane maker. Thereafter, the glass plate was heated to 75° C. to remove the organic solvent through the thermally induced phase separation, to yield a hybrid membrane.

The hybrid membrane prepared in the example comprises 67 wt. % of MIL-53(Fe) particles, can effectively adsorb and catalytically oxidize methylene blue. The removal rate against 20 mg/L methylene blue solution can be as high as 90%. In addition, the hybrid membrane exhibits ultrafiltration performance and has relatively high water flux.

Polytetrafluoroethylene, polyvinyl chloride and polyvinylidene fluoride have groups similar to halogen atoms and carbon-carbon double bonds; cellulose triacetate, cellulose diacetate and mixed cellulose have acetate radicals; sulfonated polysulfone, polyethersulfone and polysulfone have sulfonyl groups; and polyimide, polyetherimide and polyaliphatic amide have similar structures. A lot of experiments and engineering applications prove that polytetrafluoroethylene, cellulose triacetate, sulfonated polysulfone, polyethersulfone, polyvinyl chloride, polyimide and polyetherimide can be used as matrix materials of ultrafiltration membranes.

Example 13

A method of preparing a hybrid membrane is described as follows.

(1) Dispersion of Granular Material 300 mg of MIL-53(Fe) particles and 2 mL of propylene glycol methyl ether acetate were evenly mixed by ultrasonic for 30 min, to yield a dispersion solution.

(2) Mixing 300 mg of polyvinylidene fluoride and 20 mL of N,N-dimethylacetamide were evenly mixed by ultrasonic for 30 min, to yield a matrix solution. The matrix solution was mixed with the dispersion solution and treated by ultrasonic for 30 min, to yield a mixed solution.

(3) Removal of Dispersant

The mixed solution was concentrated and evaporated at 150° C. for 3 hours to remove the acetone therein, to yield a casting solution.

(4) Membrane Formation

The casting solution obtained in (3) was coated on a glass plate using a micro adjustable membrane maker. Thereafter, the glass plate was heated to 75° C. to remove the organic solvent through the thermally induced phase separation, to yield a hybrid membrane.

The hybrid membrane prepared in the example comprises 50 wt. % of MIL-53(Fe) particles, can effectively adsorb and catalytically oxidize methylene blue. The removal rate against 20 mg/L methylene blue solution can be as high as 90%.

It will be obvious to those skilled in the art that changes and modifications may be made, and therefore, the aim in the appended claims is to cover all such changes and modifications.

What is claimed is:

1. A method, comprising:
   1) mixing a granular material and a dispersant, to yield a dispersion solution;
   2) mixing a polymer and an organic solvent, to yield a matrix solution; adding the matrix solution to the dispersion solution to yield a mixed solution;
   3) heating the mixed solution obtained in 2) to remove the dispersant, to yield a casting solution; and
   4) coating the casting solution on a substrate, followed by removing the organic solvent, to yield a hybrid membrane.

2. The method of claim 1, wherein the granular material is a micron or nanoscale adsorbent or catalyst, selected from metal-organic frameworks, metal hydroxides, metal oxides, metals, graphene oxides, and graphene; and the hybrid membrane comprises 1-80 wt. % of the granular material.

3. The method of claim 1, wherein the dispersant is selected from the group consisting of acetone, methanol, ethanol, and surfactants.

4. The method of claim 1, wherein the polymer is selected from the group consisting of polyvinylidene fluoride, polytetrafluoroethylene, cellulose diacetate, cellulose triacetate, mixed cellulose, polysulfone, sulfonated polysulfone, polyethersulfone, polypropylene, polyacrylonitrile, polyvinyl chloride, polysulfonyl, amine polyether ketone, polyaliphatic amide, polyimide, and polyether imide; and the hybrid membrane comprises 20-99 wt. % of the polymer.

5. The method of claim 1, wherein the organic solvent in 2) is N, N-dimethylformamide or N, N-dimethylacetamide.

6. The method of claim 1, wherein in 1), the granular material and the dispersant are evenly mixed by mechanical stirring, magnetic stirring, oscillation, or ultrasonic.

7. The method of claim 1, wherein in 4), the substrate is a glass plate, an aluminum foil, an alumina substrate, or a polytetrafluoroethylene plate; and the casting solution is manually or automatically coated on the substrate.

8. The method of claim 1, wherein in 4), the organic solvent is removed by non-solvent induced phase separation or thermally induced phase separation.

9. The method of claim 1, wherein the dispersion solution comprises 0.1-70 wt. % of the granular material; the matrix solution comprises 1-50 wt. % of the polymer; and in 2), a weight ratio of the dispersion solution to the matrix solution is between 1: 10 and 100: 10.

10. The method of claim 1, wherein in 3), the dispersant is removed by concentrated evaporation, rotary evaporation, water bath heating, oil bath heating, oven heating, electric heating plate or electric furnace heating.

11. The method of claim 10, wherein in 3), a heating temperature is between 40 and 150° C., and a heating time is between 60 and 5000 min.

* * * * *